United States Patent Office

3,384,599
Patented May 21, 1968

3,384,599
SILOXANE-POLYOL COMPOSITIONS AND
PROCESS THEREFOR
George M. Omietanski, Tonawanda, and Thomas C. Williams, Lancaster, N.Y., assignors to Union Carbide Corporation, a corporation of New York
No Drawing. Continuation-in-part of application Ser. No. 300,628, Aug. 7, 1963. This application Aug. 13, 1964, Ser. No. 389,473
8 Claims. (Cl. 252—352)

ABSTRACT OF THE DISCLOSURE

A composition useful as a polyol reactant having a built-in foam stabilizer which comprises an organic polyol containing an average of more than two carbon-bonded hydroxyl radicals per polyol molecule and from 0.025 to about 6 weight percent organosiloxane groups, such weight percent based on total weight of the organic polyol-siloxane composition, and wherein the organopolysiloxane groups are bonded to some of the molecules of the polyol in a copolymer, said copolymer being intimately dispersed among the remainder of the organic polyol.

---

This application is a continuation-in-part of copending Ser. No. 300,628 filed Aug. 7, 1963, now abandoned.

This invention relates to novel organic polyol composition containing minor amounts of organopolysiloxane groups and to the process of preparing such compositions by reacting an excess amount of organic polyol with an organopolysiloxane containing at least one silicon-bonded group per organopolysiloxane molecule that is reactive with the hydroxyl groups of the organic polyol. This invention also relates to polyurethane foam compositions containing such novel siloxane-polyol compositions and to processes for preparing such polyurethane foam compositions.

Polyurethane foams are known in the art to be formed by reacting an organic polyol with an organic polyisocyanate or polyisothiocyanate and blowing up the reaction products into a foam by means of well known blowing agents. Various catalysts, such as amines and organo-metallic compounds, are also used in the preparation of polyurethane foams. If the polyol is principally a polyether polyol, the resulting foam is termed a "polyether-urethane." If a polyetster polyol is used, the foam is termed a "polyester-urethane." In the manufacture of polyurethane foams, it is necessary to have cells of uniform size to obtain uniform properties and it is also necessary to have a foam that does not collapse prior to forming a strong gel or curing. In many instances, the rates of blowing due to the isocyanate and water reaction which liberates carbon dioxide or by the addition of a separate blowing agent, and the rates of chain extension and crosslinking, due to the isocyanate and amine reaction, including crosslinking with polyol and reactions through active hydrogen atoms or generated urea and urethane links, are not coordinated. Hence, large irregular cells result if the foaming reaction is too rapid, or the foam collapses if the foaming action is completed before the crosslinking reaction has advanced sufficiently to provide a strong resilient product.

It is also known in the art that siloxane-oxyalkylene block copolymers can be added in minor amounts to the above polyurethane foam compositions as surfactants to aid in the formation of a stable, uniform foam to result in a polyurethane foam product having uniform cell structure. Such prior art siloxane-oxyalkylene block copolymer surfactant additives can be prepared by the well known reactions between an oxyalkylene mono-ol or diol and a siloxane containing silicon-bonded groups, such as alkoxy radicals, aryloxy radicals, acyloxy radicals, hydrogen atoms, halogen atoms, amino radicals, hydroxyl radicals, carboxyalkyl radicals and epoxyalkoxyalkyl radicals, which are reactive with the hydroxyl radicals of the oxyalkylene mono-ol or diol. Stoichiometric quantities of each reactant are generally used. Such block copolymers and methods of their preparation are described, for example, in U.S. 2,834,748 and 2,917,480. The siloxane-oxyalkylene block copolymer surfactants are generally included in the polyurethane foam composition as a separate blended additive to the organic polyol, to the organic polyisocyanate, or to the water-amine mixture frequently used as the blowing agent-catalyst mixture. As such, several disadvantages result. The siloxane-oxyalkylene block copolymers are sometimes insoluble in the organic polyols. Hence, when these components are mixed, separation of phases tends to occur with time. The mixture must be continually stirred or thoroughly remixed after storage before use in the preparation of polyurethane foams. When the siloxane-oxyalkylene block copolymer is mixed with the organic polyisocyanate or polyisothiocyanate, premature gellation of the polyisocyanate or polyisothiocyanate can occur due to catalyst residues generally present in the siloxane-oxyalkylene block copolymers. The siloxane-oxyalkylene block copolymers are generally soluble in water amine mixtures, but the surfactant effect of the block copolymer additive is noticeably diminished after only a few hours storage. Therefore, this solution must be used shortly after it is prepared. In view of the state of the prior art, it would be very desirable to be able to introduce siloxane surfactants properties into a component of a polyurethane foam composition without also having disadvantageous characteristics or handling properties.

It is a principal object of the present invention to provide an organic polyol which is modified with organosiloxane groups.

It is a further object of the present invention to provide a process for the preparation of an organic polyol containing minor amounts of organosiloxane groups bonded thereto.

It is another object of the present invention to provide an improved composition for producing polyurethane foams.

It is still another object of the present invention to provide an improved process for the production of polyurethane foams.

According to the present invention an improved organic polyol-siloxane copolymer composition comprises an organic polyol containing an average of more than two carbon-bonded hydroxyl radicals per polyol molecule and from about 0.025 to about 6 weight percent organosiloxane groups, such weight percent based on total weight of the organic polyol-siloxane composition, and wherein the organosiloxane groups are bonded to some of the molecules of the organic polyol in a copolymer, said copolymer being intimately dispersed among the remainder of the organic polyol. As used herein, the expression "organic polyolsiloxane copolymer composition" refers to a composition of organic polyol molecules and organosiloxane molecules wherein all of the organosiloxane molecules are bonded to some of the organic polyol molecules in a copolymer fashion, but a substantial portion of the organic polyol molecules are not bonded to any organosiloxane molecules. The organosiloxane groups can be attached directly to the organic polyol molecules through Si—O—C or Si—C linkages, for example. The organic polyol-siloxane compositions containing Si—O—C linkages are sometimes unstable in the presence of water since the Si—O—C linkage is cleaved in the presence of water. The organic polyolsiloxane compositions containing Si—C linkages are quite stable in the presence of water. The improved organic polyol-siloxane compositions of the present invention can be used as reactants in the formation of polyurethane foam compositions without requiring a separate surfactant. Generally, if the siloxane content of the organic polyol-siloxane composition is below about 0.025 weight percent, the composition is ineffective by itself to stabilize polyurethane foam. On the other hand, if the siloxane content of the organic polyol-siloxane composition is above about 6 weight percent, no material advantages result. It is preferred that the organic polyolsiloxane composition of the present invention contain from about 0.05 to about 5 weight percent siloxane groups. The improved organic polyol-siloxane compositions of the present invention are to be distinguished from a mere blend of organic polyol and organopolysiloxanes or blend of organic polyol and stoichiometric siloxane-oxyalkylene block copolymer in the above indicated weight percent ranges. Such blends can be incompatible and can result in phase separation as discussed above. In sharp contrast to this, the novel organic polyol-siloxane copolymer compositions of the present invention have the critical amount of organopolysiloxane groups bonded to some of the organic polyol molecules in a copolymer and such copolymer molecules are intimately dispersed within the remainder of the organic polyol. This is more than a mere blend. The resulting compositions have no undesirable phase separation and also have improved surfactant properties over the surfactant properties of a mere blend of organic polyol and organopolysiloxane or blend of organic polyol and siloxane-oxyalkylene block copolymer.

The organic polyols useful in forming the novel compositions of the present invention can be selected, for example, from one or more polyols of the following classes of compositions.

(a) Hydroxyl-terminated polyesters and polyesterethers;

(b) Polyhydroxyalkanes and alkylene oxide adducts thereof;

(c) Trialkanolamines and alkylene oxide adducts thereof;

(d) Alcohols derived from mono- and polyamines by addition of alkylene oxides;

(e) Alkylene oxide adducts of aromatic amine/phenol/aldehyde ternary condensation products;

(f) Alkylene oxide adducts of phosphorus and polyphosphorus acids, and various hydroxyl-terminated phosphites and phosphonates;

(g) Alkylene oxide adducts of polyphenols;

(h) Polytetramethylene glycols, and the like;

(i) Functional glycerides, such as castor oil.

Illustrative hydroxyl-terminated polyesters are those which are prepared by polymerizing a lactone (preferably an epsilon-caprolactone) in the presence of an active hydrogen-containing starter as disclosed in U.S. Patent 2,914,556. Polyesters from adipic acid and diols such as ethylene glycol, propylene glycol, diethylene glycol, dipropylene glycol, and the like, and triols such as 1,1,1-trimethylolpropane, 1,2,6-hexanetriol, glycerol, and others are also useful. Copolymers of lactones and alkylene oxides can also be used with good results.

Illustrative polyhydroxyalkanes include, among others, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. The alkylene oxide adducts of the above-exemplified polyhydroxyalkanes can also be employed, preferably the ethylene oxide, propylene oxide, the epoxybutane, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides having 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N'-tetrakis(2-hydroxyethyl)ethylenediamine,
N,N,N',N'-tetrakis(2-hydroxypropyl)ethylenediamine,
N,N,N',N'',N''-pentakis(2-hydroxypropyl)diethylenetriamine, phenyldiisopropanolamine and higher alkylene oxide adducts of aniline, and the like. Others which deserve particular mention are the alkylene oxide adducts of aniline or substituted-aniline/formaldehyde condensation products.

A further useful class of polyols are the alkylene oxide adducts of polyphenols wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tri-polyphosphoric acid, and the like are desirable for use in the connection. Also useful are phosphites such as tris(di-propylene glycol) phosphite and the phosphonates which can be produced therefrom by heating in the presence of, e.g., butyl bromide.

Another useful class of polyols are the polytetramethylene glycols, which are prepared by polymerizing tetrahydrofuran in the presence of an acidic catalyst.

Also useful are castor oil and alkylene oxide adducts of castor oil.

The polyols useful in the present invention can also include blends of the above indicated polyol materials with oxyalkylene mono-ols and diols. Such mono-ols and diols include, for example, the well known monohydroxypolyoxyalkylene monoethers and polyoxyalkylene diols containing the polymeric unit $(C_bH_{2b}O)_x$ wherein $b$ is an integer from 2 to 4 inclusive and $x$ is a number having a value of at least 2. The polymeric structure of the monohydroxy polyoxyalkylene monoether is endblocked on one end by an alkoxy group and on the other end by a hydroxyl group. The polymeric structure of the polyoxyalkylene diol is endblocked on both ends by hydroxyl groups. Compounds wherein the $(C_bH_{2b}O)_x$ unit has a molecular weight up to about 10,000 or higher can be used. Compounds wherein the $(C_bH_{2b}O)_x$ unit has a molecular weight of from about 200 to about 6000 are preferred. The oxyalkylene group need not be the same throughout the molecule and can comprise oxyalkylene groups of different composition, such as oxyethylene, oxy-1,2-propylene, oxy-1,3-propylene, oxybutylene and the like. Monohydroxy polyoxypropylene monoethers suitable for use in this invention are described in U.S. 2,448,664. Monohydroxyoxyethylene-oxy-1,2-propylene monoethers having both oxyethylene and oxypropylene groups in the molecule are described in U.S. 2,425,755. The polyoxyalkylene diols employed in this invention are the well known polyoxyethylene glycols, polyoxypropylene glycols and polyoxybutylene glycols as well as the polyoxyethylene-polyoxypropylene diols described in U.S. 2,425,845. These mono-ols and diols are prepared by well known techniques. For the purposes of this invention the polyol or polyol mixture or polyol mixture with mono-ols and/or diols must contain an average of more than two carbon-bonded hydroxyl groups per polyol molecule.

The polyol or polyol mixture employed can have hydroxyl numbers which vary over a wide range. As used herein, the term "polyol" includes single species of polyol, mixtures of polyols and mixtures of polyols with mono-ols and diols. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of miligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where $OH$ = hydroxyl number of the polyol
$f$ = average functionality, that is, average number of hydroxyl groups per molecule of polyol
$M.W.$ = average molecular weight of the polyol.

The exact polyol employed depends upon its intended end-use. For example, when used to prepare polyurethane foams, the molecular weight and the hydroxyl number are selected properly to result in flexible, semi-flexible, or rigid foams. The above polyols preferably possess a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the above described polyols. The polyols useful in the present invention are well known and are prepared by well known techniques.

The organic polyol-siloxane copolymer compositions of the present invention contain organosiloxane groups in the form of siloxane "blocks." Such siloxane blocks are bonded directly to some of the organic polyol molecules in the form of a copolymer, said copolymer being intimately dispersed among the remainder of the organic polyol. The individual siloxane blocks can have linear, cyclic, branched or crosslinked structures and the resulting organic polyol-siloxane copolymer compositions can thus contain linear, cyclic, branched or crosslinked structures.

The siloxane blocks in such organic polyol-siloxane copolymer compositions each contain at least two siloxane units that are represented by the formula:

(1) $$R_aSiO_{\frac{4-a}{2}}$$

wherein R is selected from the class consisting of monovalent hydrocarbon groups, halogen-substituted monovalent hydrocarbon groups, divalent hydrocarbon groups, divalent groups having the formula —$(CH_2)_nCOO$— wherein $n$ has a value of 2 to 3 inclusive and the group is bonded to silicon through a silicon-to-carbon linkage, and divalent groups having the formula

—$(CH_2)_3OCH_2CH(OH)CH_2O$— wherein the group is bonded to silicon through a silicon-to-carbon linkage, and $a$ has a value from 1 to 3 inclusive. Preferably, each R contains from one to about twenty carbon atoms. The groups represented by R can be the same or different in any given siloxane unit or throughout the siloxane blocks, and the value of $a$ in the various siloxane units in the siloxane blocks can be the same or different. Each siloxane block contains at least one siloxane unit represented by Formula 1 above selected from the class consisting of (A) units represented by the Formula 2 $R^1SiO_{3/2}$ wherein $R^1$ is selected from the class consisting of monovalent hydrocarbon groups and divalent hydrocarbon groups, (B) units represented by the Formula 3 $R_2^2SiO$, wherein $R^2$ is a monovalent hydrocarbon group, and (C) units represented by Formula 1 above wherein at least one group represented by R is selected from the class consisting of divalent hydrocarbon groups divalent groups having the formula —$(CH_2)_nCOO$— wherein $n$ has a value of 2 to 3 inclusive and the group is bonded to silicon through a silicon-to-carbon linkage, and divalent groups having the formula

—$(CH_2)_3OCH_2CH(OH)CH_2O$— wherein the group is bonded to silicon through a silicon-to-carbon linkage. In siloxane blocks containing siloxane units of type (A) above, the trifunctional silicon atom is connected directly to an organic polyol through silicon-to-oxygen-to-carbon linkage or it is connected to difunctional type (B) units which in turn are connected to an organic polyol through silicon-to-oxygen-to-carbon linkage. In siloxane blocks containing siloxane units of type (B) above, the difunctional silicon atom is connected to an organic polyol through silicon-to-oxygen-to-carbon linkage. In siloxane blocks containing units of type (C) above the divalent R group is connected to silicon through a silicon-to-carbon linkage and to an organic polyol through a carbon-to-oxygen-to-carbon linkage. Each siloxane block has a ratio of hydrocarbon groups to silicon atoms from 1:1 to 3:1.

Illustrative of the monovalent hydrocarbon groups that are represented by R in formula (1), by $R^1$ in Formula 2 and by $R^2$ in Formula 3 are alkyl groups, such as methyl, ethyl, isopropyl, octyl, dodecyl, octadecyl, eicosyl and the like; aryl groups, such as phenyl, naphthyl, terphenyl and the like; alkenyl groups, such as vinyl, allyl and the like; cycloalkyl groups, such as cyclohexyl and the like; cycloalkenyl groups, such as cyclohexenyl and the like; aralkyl groups, such as benzyl, phenylethyl and the like; and alkaryl groups, such as styryl, tolyl, n-hexylphenyl and the like.

Illustrative of the halogen-substituted monovalent hydrocarbon groups that are represented by R in Formula 1 are chloromethyl, trichloroethyl, perfluorovinyl, para-bromobenzyl, iodophenyl, alpha-chloro-beta-phenylethyl, para-chlorotolyl, bromocyclohexyl and the like.

Illustrative of the divalent hydrocarbon groups represented by R in Formula 1 and by $R^1$ in Formula 2 are the alkylene groups, such as methylene, ethylene, propylene, butylene, 2,2-dimethyl-1,3-propylene, decylene, eicosylene and the like; the arylene groups, such as the phenylene, p,p'-diphenylene and the like; and the alkarylene groups, such as phenylethylene and the like. Preferably, the divalent hydrocarbon group is an alkylene group containing from 2 to 4 successive carbon atoms. Siloxane groups containing divalent hydrocarbon groups as substituents are illustrated by groups having the formulas:

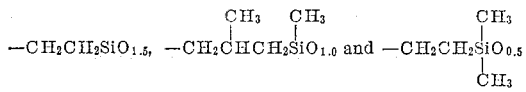

The siloxane block can contain siloxane groups that are represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups). The siloxane block can contain one or more types of siloxane groups that are represented by Formula 1 provided that each siloxane block has at least one unit of type (A), (B) or (C) described above. The siloxane block can contain trifunctional siloxane groups (e.g., monomethylsiloxy group, $CH_3SiO_{1.5}$), difunctional siloxane groups (e.g., dimethylsiloxy group, $(CH_3)_2SiO_{1.0}$), monofunctional siloxane groups (e.g., trimethylsiloxy group, $(CH_3)_3SiO_{0.5}$), or combinations of these types of siloxane groups having the same or different substituents. Due to the functionality of the siloxane groups, the siloxane block can be predominately linear or cyclic or branched or it can have combinations of these structures. The siloxane block can also contain organic end-blocking or chain terminating groups as well as the monofunctional siloxane chain terminating groups encompassed by Formula 1. By way of illustration, the siloxane block can contain such organic end-blocking groups as the hydroxyl group; the aryloxy groups, such as phenoxy and the like; the alkoxy groups, such as methoxy, ethoxy, propoxy, butoxy and the like; the acyloxy groups, such as acetoxy, propionyloxy, benzoyloxy and the like. The siloxane block can contain, in addition to the groups represented by Formula 1, one or more siloxane groups represented by the Formula 4:

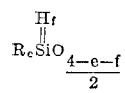

wherein R has the meaning defined in Formula 1, $e$ has a value from 0 to 2 inclusive, $f$ has a value from 1 to 2 inclusive and $e+f$ has a value from 1 to 3 inclusive. The siloxane blocks useful in the organic polyol-siloxane compositions of the present invention contain at least two siloxane groups that are represented by Formula 1. Preferably, the siloxane blocks contain a total of at least five siloxane groups that are represented by Formulas 1 and 4. The siloxanes useful in the present invention are well known and are prepared by well known techniques.

The copolymeric bond between the siloxane blocks and the organic polyol can result in several types of organic polyol-siloxane structures. Using a linear dihydrocarbyl siloxane as an example, there can be one point of attachment at one end of the linear siloxane chain. This is represented by the formula:

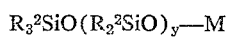

wherein $R^2$ is defined above, $y$ has a value of at least two and M represents the organic polyol. In another type there can be a point of attachment at each end of the linear siloxane chain. This is represented by the formula:

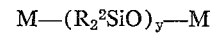

In still other types, there can be two points of attachment at one end or at both ends of the linear siloxane chain, as shown in the formulas:

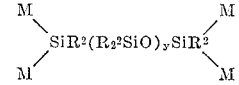

and

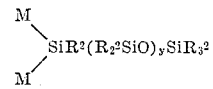

In a variation of the above structures, some of the attachment points can be to a polyoxyalkylene mono-ol while the remaining attachment points are connected to polyols. This is shown by the formulas:

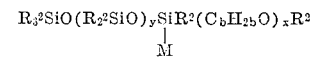

and

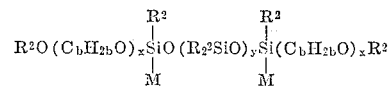

wherein $b$ has a value of 2 to 4 and $x$ has a value of at least two. In still another type of linear siloxane structure, there can be variable points of attachment to a polyol along the linear siloxane chain, as shown by the formula:

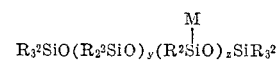

wherein $z$ has a value greater than one.

A branched chain siloxane can result in still different types of organic polyol-siloxane structures. These are shown by the formula:

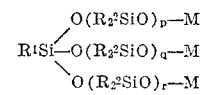

wherein $p$, $q$ and $r$ are numbers having value of 0 and greater and the sum of $p+q+r$ is equal to $y$ described above. In this instance, the sum of $p+q+r$ has a minimum value of 3. Another example of branched chain structure is shown by the formula:

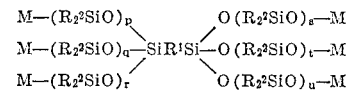

wherein $s$, $t$ and $u$ are numbers having a value of 0 and greater and the sum of $p+q+r+s+t+u$ is equal to $y$ and in this instance has a minimum value of 6. There are other possibilities, of course, for attaching a linear or branched siloxane chain to a polyol, or to a mixture of polyols, known to persons skilled in the art. The above examples are given by way of illustration only and not by way of limitation.

The molecular weight of each of the siloxane block portions of the organic polyol-siloxane copolymer compositions of the present invention can vary from less than 200 to 50,000 and higher. The preferred molecular weight range for each of the siloxane block portions is from about 400 to about 10,000.

The organic polyol-siloxane compositions of the present invention are prepared by the novel process of reacting an excess amount of organic polyol containing an average of more than two carbon-bonded hydroxyl radicals per polyol molecule with an organopolysiloxane containing at least one silicon-bonded group per organopolysiloxane molecule that is reactive with the hydroxyl groups of the organic polyol. The reactants are employed in amounts necessary to obtain an organic polyol-siloxane copolymer reaction product that contains from about 0.025 to about 6 weight percent, and preferably from about 0.05 to about 5 weight percent, organosiloxane groups, such weight percent based on total weight of reaction product. The organosiloxane is thus used in an amount from about 0.025 to about 6.5 parts by weight per 100 parts by weight of the organic polyol and preferably from about 0.053 to about 5.3 parts by weight per 100 parts by weight of organic polyol. The reactive groups of the organopolysiloxane that can react with the hydroxyl groups of the organic polyol to result in the desired product are alkoxy groups, such as methoxy, ethoxy, butoxy and the like; aryloxy groups such as phenoxy and the like; acyloxy groups, such as acetoxy, propionyloxy, benzoloxy and the like; hydrogen atoms; halogen atoms, such as chlorine, bromine, fluorine and the like; amino groups such as $NH_2$, $NHR^2$ and $NR_2^2$ wherein $R^2$ is defined above as a monovalent hydrocarbon group; hydroxyl groups; carboxyalkyl groups, such as

—$CH_2CH_2COOH$, —$CH_2CH_2CH_2COOH$ and the like; and epoxyalkoxyalkyl groups, such as

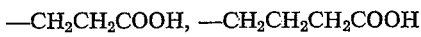

and the like.

Thus the instant invention may be described more specifically as an organic polyol-organopolysiloxane copolymer composition suitable for reaction with an organic polyisocyanate in the presence of a catalyst and a blowing agent to produce a polyurethane foam, said composition having been produced by a process which comprises reacting at a temperature from 0° C. to 200° C. (a) an excess amount of organic polyol containing an average of more than two carbon-bonded hydroxyl radicals per polyol molecule and containing reactive groups selected from the group consisting of said hydroxyl radicals, MO— groups where M is an alkali metal and monovalent olefinic groups, with (b) an organopolysiloxane containing at least two silicon-bonded groups per organopolysiloxane molecule that are reactive with the reactive groups of the organic polyol, said organopolysiloxane being present in the reaction mixture in an amount of from about 0.025 to about 6.5 parts by weight per 100 parts by weight of the organic polyol and said composition being composed of a substantial portion of unreacted polyol and a polyol-organopolysiloxane copolymer in which the organopolysiloxane groups are linked to polyol molecules by silicon to oxygen to carbon or silicon to carbon linkages.

The types of reactions which fall within the above described process are indicated by the following illustrative equations:

(a) $\equiv SiOR^3 + HOC\equiv \longrightarrow \equiv SiOC\equiv + R^3OH$ (b) $\equiv SiO\overset{O}{\underset{\|}{C}}-R^3 + HOC\equiv \longrightarrow \equiv SiOC\equiv + HO\overset{O}{\underset{\|}{C}}-R^3$ (c) $\equiv SiH + HOC\equiv \longrightarrow \equiv SiOC\equiv + H_2$ (d) $\equiv SiX + HOC\equiv \longrightarrow \equiv SiOC\equiv + HX$ (e) $\equiv SiOH + HOC\equiv \longrightarrow \equiv SiOC\equiv + H_2O$ (f) $\equiv Si(CH_2)_nCOOH + HOC\equiv \longrightarrow \equiv Si(CH_2)_nCOOC\equiv + H_2O$ (g) 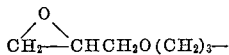
$\equiv Si(CH_2)_3OCH_2CH\overset{O}{\diagup\diagdown}CH_2 + HOC\equiv \longrightarrow$
$\equiv Si(CH_2)_3OCH_2CH(OH)CH_2OC\equiv$ (h) $\equiv SiCH=CH_2 + HOC\equiv \longrightarrow \equiv SiCH_2CH_2C\equiv$
$\underset{OH}{|}$

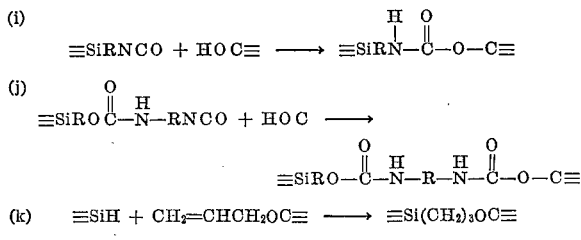

In the above equations, $R^3$ represents a monovalent alkyl or aryl group, X represents a halogen atom or amino group, such as $NH_2$, $NHR^2$ and $NR_2^2$ wherein $R^2$ is a monovalent hydrocarbon radical, Hal represents a halogen, i.e., bromine, chlorine, fluorine, or iodine, M is an alkali metal such as sodium or potassium, and R is a divalent hydrocarbon radical, preferably a saturated aliphatic radical such as ethylene, propylene, n-butylene, isoamylene, hexamethylene and the like. In the equations (a) through (j) the Si-containing group on the far left represents the reactive portion of the siloxane while the $HOC\equiv$ group represents a hydroxyl reactive portion of the organic polyol. In equations (k) and (l) the Si-containing group on the far left represents the reactive portion of the siloxane and the $CH_2=CHCH_2OC\equiv$ and $MOC\equiv$ groups represent polyols in which some of the hydroxy groups have been replaced by allyloxy and metaloxy groups respectively in order to provide groups reactive with $\equiv SiH$ and $\equiv SiR$ Hal respectively. Methods for modifying polyols to provide allyloxy and metaloxy groups are illustrated in Example VIII hereinafter. The reaction of equation (a) takes place in the presence of an acidic catalyst, such as trifluoroacetic acid, or a basic catalyst, such as potassium silanolate. It is also desirable to carry out the reaction in the presence of a suitable solvent, such as toluene or xylene. These reaction conditions are described in more detail in U.S. 2,834,748 and 2,917,480. The alkoxy or aryloxy-containing siloxanes useful in this process are well known and are prepared by well known techniques such as reaction between a polysiloxane and mono-, di- or trialkoxysilane in the presence of an alkaline catalyst. The reaction of equation (b) requires no catalyst or solvent, only heating the reactants together. The acryloxysiloxanes employed in the process are well known and are prepared by well known processes, such as those described in U.S. 2,910,-496; 3,035,016 and British 899,938 for example. The reaction of equation (c) takes place in the presence of a catalyst, such as zinc chloride or chloroplatinic acid. This general reaction is described in more detail in U.S. 2,967,171. The Si-H containing reactants are well known and are prepared by well known techniques. The reaction of equation (d) takes place in the presence of an acid acceptor, such as triethylamine, pyridine and the like, when X is a halogen. A suitable solvent, such as toluene, benzene and the like is desirable but not necessary. This type of reaction is described in U.S. 2,730,532 and 2,776,-307. The reaction of equation (d) does not require a catalyst when X is an amine group, but an acid catalyst, such as HCl, $H_2SO_4$ and the like can be used to shorten the reaction time. Solvents such as benzene, toluene and the like are desirable but not necessary. This type of reaction is described in U.S. 2,876,209. The halogen and amino substituted siloxanes are well known and are prepared by well known techniques. The reaction of equation (e) takes place in the presence of acid catalysts, such as p-toluene sulfonic acid, or basic catalysts, such as sodium methylate. This type of reaction is described in J. Am. Chem. Soc. 76, 3408 (1954). The hydroxy-containing siloxanes are well known and are prepared by well known techniques. The reaction of equation (f) can be carried out with any of the conventional esterification catalysts, such as p-toluene sulfonic acid, sulfuric acid, phosphoric acid and the like. This type of reaction is described in U.S. 2,916,507 and U.S. 2,966,508. The carboxyalkyl-containing siloxanes are well known and are prepared by well known techniques. The reaction of equation (g) takes place in the presence of a Lewis acid catalyst, such as aluminum trichloride, stannic chloride and the like. This type of reaction is described in U.S. 3,057,901. The epoxy-alkoxyalkyl-containing siloxanes are well known and are prepared by well known techniques. The reaction of equation (h) is readily carried out in an inert solvent medium such as xylene at reflux temperature (~165° C.) using a peroxide catalyst such as ditertiarybutyl peroxide. An illustrative preparation is set forth in Example IX hereinafter. Similarly, illustrative examples of equations (i), (j), (k) and (l) appear hereinafter.

In general, however, reaction conditions for carrying out the process of this invention are not narrowly critical. The reaction temperature can be from about 0° C. to about 200° C. At reaction temperatures below about 0° C., the reaction time is unduly long. At reaction temperatures above about 200° C. there are no material advantages and the siloxane reactants tend to undergo decomposition. The reaction temperature is preferably from about 25° C. to about 180° C. Atmospheric pressure is preferred, but the process can be carried out at reaction pressures above and below atmospheric if desired. The specific combination of catalyst, if needed, and solvent, if needed, employed in the process will be determined primarily by the reactive groups on the organosiloxanes as described above.

The novel organic polyol-siloxane compositions of the present invention can be used as emulsification agents, foaming and defoaming promoters, leveling agents, wetting agents, corrosion inhibitors, anti-fogging agents, and the like.

As mentioned above, the novel organic polyol-siloxane copolymer compositions of the present invention can also be used as a reactive component in a polyurethane foam composition. The composition mixtures useful for producing polyurethane foams comprise an organic polyol-siloxane copolymer composition as described above, an organic polyisocyanate or polyisothiocyanate, catalysts and blowing agent. Such polyurethane foam compositions are novel in that they include novel organic polyol-siloxane copolymer compositions which preclude the necessity for separate surfactant additives in order to obtain stable uniform foams with desired characteristics. These novel polyurethane foam compositions have substantially uniform cells which do not collapse prior to gelling or curing of the polyurethane. The resulting polyurethane foam products can be used in insulating applications, carpet underlays, bumpers, pillows, buoyant elements for boats, and the like. Such utility is well known. It should be understood that useful polyurethane foam compositions can contain not only the novel organic polyol-siloxane copolymer compositions of the present invention as the reactive polyol, but also mixtures of novel organic polyol-siloxane copolymer compositions with conventional polyols.

A large variety of organic polyisocyanates and polyisothiocyanates are known in the art to be useful in the production of polyurethanes. For example, preferred isocyanates or polyisocyanates and polyisothiocyanates of the general formula:

$$(R^4NCG)_c$$

wherein G is oxygen or sulfur, $c$ is an integer of two or more and $R^4$ is an alkylene; substituted alkylene; arylene or substituted arylene radical; a hydrocarbon, or substituted hydrocarbon containing one or more aryl —NCG bonds and one or more alkyl —NCG bonds. $R^4$ can also include radicals such as —$R^4ZR^4$— where Z may be a divalent moiety such as —O—, —O—$R^4$—O—, —CO—, —CO$_2$—, —S—, —S—$R^4$—S—, —SO$_2$—, etc. Examples of such compounds include hexamethylene diisocyanate, xylylene diisocyanates, (OCNCH$_2$CH$_2$CH$_2$OCH$_2$)$_2$, 1-methyl-2,4-diisocyanate-cyclohexane, phenylene diisocyanate, 2,4-, and 2,6-tolylene diisocyanates, chlorophenylene diisocyanates, diphenylmethane-4,4'-diisocyanate, naphthalene-1,5-diisocyanate, triphenylmethane-4,4',4''-triisocyanate, xylene-α, α'-diisothiocyanate, and isopropylbenzene-α,4-diisocyanate.

Further included are dimers and trimers of isocyanates and diisocyanates and polymeric diisocyanates of the general formulae:

$$(R^4NCG)_c \text{ and } [R^4(NCG)_c]_d$$

in which $c$ and $d$ are two or more, as well as compounds of the general formula:

$$A(NCG)_c$$

in which $c$ is two or more and A is a monofunctional or polyfunctional atom or group. Examples of this type include ethylphosphonic diisocyanate, C$_2$H$_5$P(O)(NCO)$_2$; phenylphosphonicdiisocyanate, C$_6$H$_5$P(O)(NCO)$_2$; compounds containing a —Si—NCG groups, isocyanates derived from sulfonamides R$^4$(SO$_2$NCO), and the like. The preferred isocyanate is tolylene diisocyanate. Additional useful polyisocyanates are disclosed in an article by Siefken, Annalen, 562, pages 122–135 (1949).

The polyurethane foamed products can be produced, for example, by the one-shot technique wherein all of the reactants are reacted simultaneously in the foaming operation. The second type of general process is the prepolymer process. In this method a prepolymer is formed by completing the reaction between the organic polyol-siloxane copolymer composition and the isocyanate. The prepolymer can later be foamed by reaction with water or inert blowing agent. Also, the quasi-prepolymer technique can be used to produce foams. In this technique, the isocyanate is first reacted with a portion of the organic polyol-siloxane copolymer composition to give a product having a high percentage of free —NCO groups (e.g., from 20 to 50 percent), and this product is subsequently foamed by reaction with the remainder of the organic polyoyl-siloxane copolymer composition and foaming agent.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive reaction, or by a combination of the two methods. All of these methods are known in the art. The preferred blowing agents are water and certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1 - difluoro - 1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2 - trifluoroethane, 2-chloro-1,1,1,2,3,3,4,4,4-nonafluorobutane, hexafluorocyclobutane, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N-N'- dimethyl-dinitrosoterephthalamide.

The amount of blowing agent used will vary with the density desired in the foamed product. In general, it may be stated that for 100 grams of reaction mixture containing an average isocyanate/reactive hydrogen ratio of about 1:1, about 0.005 to 0.3 moles of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example:

(a) tertiary amines such as trimethylamine, triethylamine, N-methylmorpholine, N-ethylmorpholine, N,N-dimethylbenzylamine, N,N-dimethylethanolamine, N,N,N',N' - tetramethyl-1,3-butanediamine, triethanolamine, 1,4-diazabicyclo[2.2.2.]octane, 1,2,4-trimethylpiperazine, bis(dimethylaminomethyl)amine, N,N,N',N' - tetraalkyl-1,3-propanediamine, and the like;

(b) tertiary phosphine such as trialkylphosphines, dialkyl benzylphosphines, and the like;

(c) strong bases such as alkali and alkaline earth metal hydroxides, alkoxides, and phenoxides;

(d) acidic metal salts of strong acids such as ferric chloride, stannic chloride, stannous chloride, antimony trichloride, bismuth nitrate and chloride, and the like;

(e) chelates of various metals such as those which can be obtained from acetylacetone, benzoylacetone, trifluoroacetylacetone, ethyl acetoacetate, salicylaldehyde, cyclopentanone-2- carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) alcoholates and phenolates of various metals such as $Ti(OR^3)_4$, $Sn(OR^3)_4$, $Sn(OR^3)_2$, $Al(OR^3)_3$, and the like, wherein $R^3$ is alkyl or aryl, and the reaction products of alcoholates with carboxylic acids, beta-diketones, and 2-(N,N-dialkylamino)-alkanols, such as the well known chelates of titanium obtained by said or equivalent procedures;

(g) salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin, dilaurate, dibutyltin maleate, dilauryltin, diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The tin catalysts are the preferred metal catalysts. The catalysts are employed in small amounts, for example, from about 0.001 percent to about 5 percent, based on weight of the reaction mixture.

In addition to the above described organic polyol-siloxane, polyisocyanate or polyisothiocyanate, catalysts and blowing agents, the polyurethan foam compositions may contain, if desired, other components such as:

(a) diol foaming modifiers, such as ethylene glycol, polyethylene glycol and the like;

(b) crosslinking agents, such as pentaerylthritol, glycerol, N,N,N',N'-tetrakis(2-hydroxypropyl)ethylene diamine, and the like;

(c) flame retardants, generally alkyl phosphates or inorganic compounds, such as antimony oxide and the like;

(d) thermal stabilizers, such as d-tartaric acid, t-butyl catechol and the like;

(e) plasticizers, such as di-octyl phthalate and the like;

(f) fillers, such as scrap shredded polyurethane foam, wood flour, metal flakes, and the like;

(g) pigments, such as titania, silica, carbon black and the like;

(h) dyes, antioxidants, antiozonants, deodorants, fungicides, and the like.

The examples which follow illustrate various aspects of the invention. In these examples "Me" represents a methyl ($CH_3$) radical, "Ac" represents an acetyl

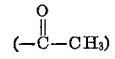

radical and "Et" represents an ethyl ($C_2H_5$) radical.

EXAMPLE I

About 500 grams of a glycerol-started polypropylene oxide having a nominal molecular weight of 3000 and an average hydroxyl number of 56 milligrams of KOH/gram of polyol were heated together with 5.6 grams of $(AcO)_2SiMeO(Me_2SiO)_{10.7}SiMe(OAc)_2$ in a one-liter, 3-necked flask, equipped with a stirrer, gas sparge tube, Dean-Stark trap, condenser, heating mantle and temperature controller. The initially incompatible mixture was heated with stirring while a stream of dry nitrogen was sparging the mixture for 2.5 hours at 120° C. A quantitative yield of clear water-white organic polyol-siloxane copolymeric product was obtained having the following properties: viscosity of 775 centipoises at 25° C., an OH content of 1.4% as measured by the Grignard method, and a calculated siloxane content of 0.87 weight percent. This product was useful as a component of a polyurethane foam composition which resulted in a flexible product of uniform cell structure.

EXAMPLE II

The general procedure of Example I was repeated using as the polyol a mixture containing 50 weight percent of a glycerol-started polypropylene oxide having a nominal molecular weight of 3000 and an average hydroxyl number of 56 milligrams KOH/gram and 50 weight percent of a polypropylene glycol having a nominal molecular weight of 2000 and an average hydroxyl number of 56. Heating was continued for 3 hours at 120° C. to produce a clear water-white organic polyol-siloxane copolymeric product having a viscosity of 400 centipoises at 25° C. and a calculated siloxane content of 0.87 weight percent. This product was useful as a component of a polyurethane foam composition which resulted in a flexible foamed product of uniform cell structure.

EXAMPLE III

The general procedure of Example I was repeated using as the polyol a sorbitol-started polypropylene oxide having a nominal molecular weight of 700 and an average hydroxyl number of 490. Heating was continued for 3 hours at 120° C. to produce a turbid, brown organic polyol-siloxane copolymeric product having a viscosity of 10,000 centipoises at 25° C. and a calculated siloxane content of 0.18 weight percent. This product was useful as a component of a polyurethane foam composition which resulted in a rigid foamed product of uniform cell structure.

EXAMPLE IV

The general procedure of Example I was repeated using as the polyol a glycerol-started polypropylene oxide having a nominal molecular weight of 1000 and an average hydroxyl number of 168. Heating was continued for 3 hours at 120° C. to produce a clear, water-white organic polyol-siloxane copolymeric product having a viscosity of 310 centipoises at 25° C. and a calculated siloxane content of 0.18 weight percent. This product was useful as a component of a polyurethene foam composition which resulted in a semi-rigid foamed product of uniform cell structure.

EXAMPLE V

The general procedure of Example I was repeated using as the polyol a glycerol-started polypropylene oxide with about 10 weight percent ethylene oxide subsequently added, the polyol having a nominal molecular weight of 3750 and an average hydroxyl number of 45. Heating was continued for 3 hours at 120° C. to produce a clear, water-white organic polyol-siloxane copolymeric product having a calculated siloxane content of 0.49 weight percent. This product was useful as a component of a polyurethane foam composition.

EXAMPLE VI

About 600 grams of dehydrated glycerol-started polypropylene oxide having a nominal molecular weight of 3000 and an average hydroxyl number of 56 milligrams of KOH/gram of polyol were charged along with 2.7 grams of an ethoxy end-blocked dimethylpolysiloxane branched structure including a trifunctional silicon atom (approximate formula is $MeSi[O(Me_2SiO)_6Et]_3$) having a nominal molecular weight of 1524, 1 gram of trifluoroacetic acid and 200 ml. of toluene to a 2-liter, 3-necked flask, equipped with a stirrer, a 10-in. long packed distillation column, a thermometer and a heating mantle. This mixture was heated at 137° C. for 4 hours. During this period, volatiles, such as ethanol, water, toluene, ethyl trifluoroacetate and trifluoroacetic acid were removed from the reaction mixture. Final devolatilization was carried out by sparging the reaction mixture with dry nitrogen gas at temperatures up to 180° C. Filtration of the resulting product gave a nearly quantitative yield of slightly yellow copolymer, which had a viscosity of 650 centipoises at 25° C. and a calculated siloxane content of 0.41 weight percent. This product was useful as a component of a polyurethene foam composition.

EXAMPLE VII

About 500 grams of a dried glycerol-started polypropylene oxide having a nominal molecular weight of 3000 and an average hydroxyl number of 56, 2.2 grams of $Me_3SiO(Me_2SiO)_{12.8}(MeHSiO)_{2.6}SiMe_3$, and 100 parts per million by weight of chloroplatinic acid were charged to a one-liter, 3-necked flask equipped with a stirrer, condenser, thermometer and heating mantle. The reaction mixture was heated at 100° C. for 4 hours. Activated charcoal was added to the reaction mixture so as to remove catalyst and color and the resulting mixture was filtered to remove the charcoal. The filtrate was a water-white organic polyol-siloxanes copolymeric product having a viscosity of 610 centipoises at 25° C. and a calculated siloxane content of 0.42 weight percent. This product was useful as a component of a polyurethane foam composition.

EXAMPLE VIII

Sodium (0.25 g.) was dispersed in about 200 ml. of toluene by rapid stirring at 110° C. under an atmosphere of nitrogen. Then about 500 grams of a glycerol-started polypropylene oxide having a nominal molecular weight of 3000 and an average hydroxyl number of 56 milligrams of KOH/gram were gradually added over a period of 15 minutes. After the addition was completed the mixture was heated at reflux for about 10 minutes. To this clear solution was added allyl bromide (2.4 g.) in 200 ml. toluene. The mixture was then maintained at reflux for two hours. The mass at this point consisted of a polyol mixture containing some $CH_2=CH\cdot CH_2O$ (allyloxy) linkages.

About half of the toluene from the above mass was removed at reduced pressure (thus removing unreacted allyl bromide). With the temperature at 65–75° C., 4.4 grams of $Me_3SiO(Me_2SiO)_{12.8}(MeHSiO)_{2.6}SiMe_3$ and 35 parts per million by weight of chloroplatinic acid were charged. Heating was continued for four hours. Then one gram of sodium bicarbonate and two grams of activated charcoal were added. The reaction mixture was devolatilized by sparging at the rate of three liters of nitrogen per minute to 150° C. Filtration gave the organic polyol-siloxane copolymeric product as an amber oil having the following properties: viscosity of 780 centipoises at 25° C., and a calculated siloxane content of 0.84 weight percent. Infra-red analysis indicated that the siloxane was joined to the polyol mainly through $Si(CH_2)_3O$ linkages. This product was useful as a component of a polyurethane foam composition (Formulation A, infra) which resulted in a flexible product of uniform cell structure.

EXAMPLE IX

A fluid vinylsiloxane-trimethylsiloxane cohydrolyzate was prepared by adding a solution of trimethylchlorosilane (163 grams), vinyltrichlorosilane (80.7 grams), and methyltrichlorosilane (74.7 grams) to water (45 grams). The cohydrolyzate was refluxed at 100° C. until hydrogen chloride evolution ceased and then neutralized with sodium bicarbonate. After filtration and removal of material boiling below 170° C. (4 mm.), the resulting silicone fluid product had a viscosity of 116 centipoises at 25° C. and $n_D^{25}=1.4188$.

In a three-necked flask equipped with stirrer, reflux condenser and dropping funnel there was placed 60 grams of xylene and 60 grams of a glycerol-started polypropylene oxide having a nominal molecular weight of 3000 and an average hydroxyl number of 56 milligrams of KOH/gram. Sufficient xylene was removed from the flask by distillation to bring the reflux temperature to 165° C. There was then added with stirring over a three hour period a solution of two grams of di-t-butyl peroxide catalyst dissolved in 20 grams of the vinyl-containing cohydrolyzate described above, holding the temperature of the reaction flask in the range of 155–165° C. After removal of the solvent and low boiling material, the resulting clear copolymer had a viscosity of 1470 centipoises at 25° C.

The above siloxane-polyoxyalkylene polyol copolymer was effective in stabilizing polyurethane foam formulations A and B infra.

EXAMPLE X

This example describes the preparation of a silicone-polyol copolymer by the reaction of Equation 1 supra.

A fluid of the average composition

$Me_3SiO[\phi C(CH_3)HCH_2SiMeO]_{3.5}[Me_2SiO]_{8.5}SiMe_3$ was heated at 58–61° with 400 percent excess chloromethylmethyl ether for 3 hours in the presence of 0.02 mole of zinc chloride per equivalent of

$[\phi C(CH_3)HCH_2SiMeO]$

The reaction mixture was washed free of zinc chloride with distilled water and stripped of volatiles to a pot temperature of 150° C. (0.1 mm. Hg. pressure). There was obtained a nearly quantitative yield of a fluid of the average composition Me₃SiO[ClCH₂C₆H₄C(CH₃)HCH₂ 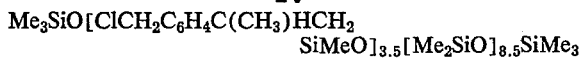
SiMeO]₃.₅[Me₂SiO]₈.₅SiMe₃ with a viscosity of 205 centistokes at 25° C., $n_D^{25}=1.4747$, and a chloride content of 7.3 weight percent.

About 500 grams of a sodium treated polyol described in Example VIII was heated at 130° C. for 3 hours with 5.0 grams of the above chloromethylated siloxane. Filtration gave a clear, organic polyol-siloxane copolymer with a viscosity of 800 centipoises viscosity at 25° C. and a calculated siloxane content of 0.8 weight percent.

The above product was useful as a component of a polyurethane foam composition which resulted in a flexible product of uniform cell structure.

EXAMPLE XI

This example describes the preparation of a silicone-polyol copolymer by the reaction of equation (i) supra.

About 600 grams of the polyol of Example IX was mixed with 10.0 grams of siloxane having the following average composition Me₃SiO[OCN(CH₂)₄SiMeO]₃.₇[Me₂SiO]₁₆SiMe₃

Two drops of stannous octoate catalyst were added and the mixture was stirred and warmed to 100° C. A yellow, organic polyolsiloxane copolymeric product was obtained with a viscosity of 755 centipoises at 25° C. and a calculated siloxane content of 1.6 weight percent.

The above siloxane-polyol copolymer was effective in stabilizing flexible polyurethane foam formulations A and B infra.

EXAMPLE XII

This example describes the preparation of a silicone-polyol copolymer by the reaction of equation (j) supra.

About 600 grams of the polyol of Example IX was mixed with 15.0 grams of a siloxane having the following average composition

Me₃SiO[MeSi(CH₂)₃O CNHC₆H₃(Me)(NCO)]₃.₅[Me₂SiO]₈.₅SiMe₃

Two drops of stannous octoate catalyst were added and the mixture was stirred and warmed to 100° C. After two hours, a clear, compatible mixture was obtained. The yellow, organic polyol-siloxane copolymeric product had a viscosity of 815 centipoises at 25° C. and a calculated siloxane content of 2.4 weight percent. Infrared analysis indicated that all the isocyanate groups had reacted.

The above product was useful as a component of a polyurethane foam composition which resulted in a flexible product of uniform cell structure.

EXAMPLE XIII

To a stirred mixture of about 500 grams of a glycerol-started polypropylene oxide having a nominal molecular weight of 3000 and an average hydroxyl number of 56 milligrams of KOH/gram, triethylamine (5.0 g.), and toluene (200 ml.), was added 9.0 grams of an alpha-omega dichloropolydimethylsiloxane mixture, having an average of 26.4 silicon atoms per molecule, in 100 ml. of toluene. The reaction was run at room temperature. The hazy reaction mixture was devolatilized by sparging with dry nitrogen to 155° C. Filtration gave the organic polyolsiloxane copolymeric product as a slightly hazy fluid having the following properties: viscosity of 740 cps. at 25° C., and a calculated siloxane content of 1.7 weight percent. Analysis indicated only trace amounts of residual halogen being present. The siloxane was joined to the polyol by SiOC linkages. This product was useful as a component of a polyurethane foam composition which resulted in a flexible product of uniform cell structure.

EXAMPLE XIV

An alpha-omega dichloropolydimethylsiloxane fluid, having an average of 22.3 silicon atoms per molecule, was heated with an excess of powdered sodium fluorosilicate to a pot temperature of 170° C. Filtration gave a water-white fluid of 54 centipoises viscosity and by titration a formula of FSiMe₂O(Me₂SiO)₂₆SiMe₂F.

A solution of 10.5 grams of the above alpha-omega difluoropolydimethylsiloxane in 200 ml. of toluene was added to about 500 grams of a sodium treated polyol prepared as in Example VIII. The reaction mixture was heated to 150° and devolatilized with a dry nitrogen sparge. Filtration gave a clear, water-white organic polyol-siloxane copolymer of 760 centipoise viscosity at 25° C. and a calculated siloxane content of 1.9 weight percent. The above siloxane-polyoxyalkylene polyol was effective in stabilizing a flexible polyurethane foam formulation, (Formulation B, infra).

EXAMPLE XV

A solution of about 500 grams of a glycerol-started polypropylene oxide having a nominal molecular weight of 3000 and an average hydroxyl number of 56 milligrams of KOH/gram in 200 ml. of toluene was mixed with 9.4 grams of (n-C₄H₉NH)SiMe₂O(Me₂SiO)₂₄.₄SiMe₂(n-C₄H₉NH)

at room temperature. A drop of dimethyldichlorosilane was added as a catalyst to the reaction mixture, followed by heating at 100° C. for two hours. Devolatilization by sparging with dry nitrogen to 160° C., followed by filtration gave a light yellow fluid having the following properties: 755 centipoises viscosity at 25° C. and a calculated siloxane content of 1.7 weight percent. This product was useful as a component of a polyurethane foam composition which resulted in a flexible product having a uniform cell structure.

EXAMPLE XVI

The general procedure of Example XV was repeated using as the siloxane

(CH₃CN)SiMe₂O(Me₂SiO)₂₄.₄SiMe₂(NHCCH₃)

Heating 4.6 grams of this siloxane with about 500 grams of the polyol of Example IX in the absence of added catalyst, for 1 hour at 100° C., followed by devolatilization, and filtration, gave a nearly quantitative yield of a reddish fluid with the following physical properties: 680 centipoises viscosity at 25° C. and a calculated siloxane content of 0.85 weight percent. Infrared analysis indicated that the product was free of acetamide by carbonyl absorption. This product was useful as a component of a polyurethane foam composition which resulted in a product of uniform cell structure.

EXAMPLE XVII

The general procedure of Example XVI was repeated using as the siloxane

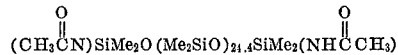

Heating 9.3 grams of this siloxane with about 500 grams of the polyol of Example IX in the absence of added catalyst, for 1 hour at 100° C., followed by devolatilization and filtration gave an amber fluid with the following properties: 750 centipoises viscosity at 25° C. and a calculated siloxane content of 1.7 weight percent. This product was useful as a component of a polyurethane foam composition which resulted in a flexible product of uniform cell structure.

EXAMPLE XVIII

The general procedure of Example XVI was repeated using as the siloxane

--(EtOC—N)SiMe₂O(Me₂SiO)₂₄.₄SiMe₂(N—COEt)--

Heating 9.2 grams of this siloxane with about 500 grams of the polyol of Example IX in the absence of added catalyst, for 2 hours at 110° C., followed by devolatilization with a nitrogen sparge to 160° C. and filtration gave a clear, water-white copolymer. The copolymer had the following properties: 780 centipoises viscosity at 25° C. and a calculated siloxane content of 1.7 weight percent. This product was useful as a component of a polyurethane foam composition which resulted in a flexible product of uniform cell structure.

EXAMPLE XIX

The general procedure of Example XVI was repeated using as the siloxane

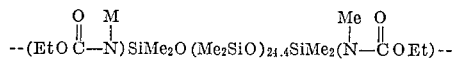

Heating 9.3 grams of this siloxane with about 500 grams of the polyol of Example IX in the absence of added catalyst, for 3 hours at 110° C., followed by devolatilization with a nitrogen sparge to 160° C., addition of decolorizing charcoal, and filtration gave a clear, off-white fluid. The copolymer had the following properties: 785 centipoises viscosity at 25° C. and a calculated siloxane content of 1.7 weight percent. This product was useful as a component of a polyurethane form composition which resulted in a flexible product of uniform cell structure.

EXAMPLE XX

The general procedure of Example XVI was repeated using as the siloxane

Heating 9.3 grams of this siloxane with about 500 grams of the polyol of Example IX, in the absence of added catalyst, for 3 hours at 110° C., followed by devolatilization with a nitrogen sparge to 160° C., addition of decolorizing charcoal, and filtration gave a clear, yellow fluid. The copolymer had the following properties: 770 centipoises viscosity at 25° C. and a calculated siloxane content of 1.7 weight percent. This product was useful as a component of a polyurethane foam composition which resulted in a flexible product of uniform cell structure.

EXAMPLE XXI

About 500 grams of the polyol of Example VIII was mixed with 15.0 grams of a siloxane having the average composition

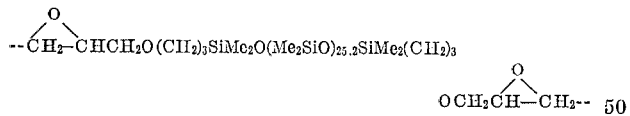

and 250 ml. of toluene. One gram of $SnCl_4$ catalyst was added and the mixture was stirred about 12 hours at 45–50° C. Alcoholic KOH was added to neutralize the catalyst followed by treatment with $CO_2$. The product was stripped to 130° C. at 10 mm. Hg pressure and filtered to give a hazy fluid having a viscosity of 790 centipoises at 25° C. and a calculated siloxane content of 2.9 weight percent.

The above product was useful as a component of a polyurethane foam composition which resulted in a flexible product of uniform cell structure.

EXAMPLE XXII

About 500 grams of the polyol of Example VIII, 10.0 grams of a siloxane having an average formula

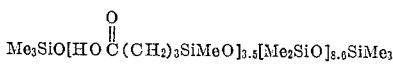

400 ml. of toluene and two grams of trifluoroacetic acid, were stirred and heated at reflux in a flask equipped with a Dean-Stark moisture trap. The time of heating at 120–150° C. was 24 hours. The reaction mixture was stripped to 150° C. and 1 mm. Hg pressure. The product was obtained as a clear, yellow copolymer having a viscosity of 720 centipoises at 25° C. and a caluculated siloxane content of 1.9 weight percent.

The above product was useful as a component of a polyurethane foam composition which resulted in a flexible product of uniform cell structure.

EXAMPLE XXIII

About 500 grams of the polyol of Example VIII was mixed with 10.0 grams of a siloxane having an average composition of

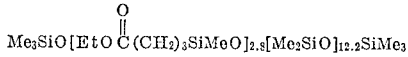

400 ml. of toluene, and five grams of trifluoroacetic acid. The reaction mixture was heated at reflux and volatiles were slowly removed over a 24 hour period. At the end of this time, the reaction mixture was stripped to a pot temperature of 160° C. at 1 mm. Hg pressure. The copolymer was obtained as clear, yellow fluid of 735 centipoises viscosity at 25° C. and a calculated siloxane content of 1.9 weight percent.

The above product was useful as a component of a polyurethane foam composition which resulted in a flexible product of uniform cell structure.

EXAMPLE XXIV

About 600 grams of the polyol of Example VIII was added to a stirred mixture of 12.0 grams of a siloxane having the average formula

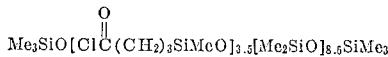

5 ml. of triethylamine and 200 ml. of toluene. After stirring for two hours at room temperature, the reaction mixture was stripped to a pot temperature of 150° C. at 1 mm. Hg pressure. Filtration gave tan, clear fluid of 730 centipoises viscosity at 25° C. and a calculated siloxane content of 1.9 weight percent.

The above product was useful as a component of a polyurethane foam composition which resulted in a flexible product of uniform cell structure.

The organic polyol-siloxane copolymeric compositions of the present invention were evaluated as polyurethane foam stabilizers in the production of flexible, semi-rigid and rigid urethane foams. The formulations which were used in these evaluations are described below and the results of these evaluations are tabulated in the subsequent table. All parts are by weight.

FORMULATION A

Component I

| | Parts |
|---|---|
| Organic polyol-siloxane of Examples I, II, V, VI or VII | 450 |
| Water | 12 |
| Triethylamine | 0.3 |
| Dibutyltin dilaurate | 3.0 |

Component II

| | Parts |
|---|---|
| Tolylene diisocyanate | 165.6 |

Urethane foams were prepared by adding component II to component I which was well stirred, followed by a cure at 110° C. for 15 minutes. The foam was then sliced and the center section was evaluated.

FORMULATION B

Component I

| | Parts |
|---|---|
| Organic polyol-siloxane of Example I | 350 |
| Water | 14 |
| Tetramethylbutanediamine | 0.35 |
| N-ethylmorpholine | 0.70 |
| Stannous octoate | 1.05 |

21

Component II

| | Parts |
|---|---|
| Tolylene diisocyanate | 174.5 |

The procedure was the same as in Formulation A.

FORMULATION C

Component I

| | Parts |
|---|---|
| Organic polyol-siloxane of Example IV | 100 |
| Water | 2 |
| A dimethylpolysiloxane-water emulsion containing 50 weight percent dimethylpolysiloxane | 0.6 |
| Stannous octoate | 0.6 |

Component II

| | Parts |
|---|---|
| 4,4'-diphenylmethane diisocyanate plus 1 weight percent tolylene diisocyanate | 56.2 |

The procedure was the same as in Formulation A.

FORMULATION D

Component I

| | Parts |
|---|---|
| Organic polyol-siloxane of Example III | 42 |
| Trichlorofluoromethane | 16 |
| Dimethylethanolamine | 0.5 |
| Dibutyltin dilaurate | 0.6 |

Component II

| | Parts |
|---|---|
| Tolylene diisocyanate | 40.4 |

The procedure was the same as in Formulation A.

The formulations below were repeated with polyols which had not been reacted with siloxanes. No stabiliza-

EVALUATION OF POLYURETHANE FOAMS

| Polyol-Siloxane Copolymer Ex. No. | Foam Type | Formulation | Foam Performance | | |
|---|---|---|---|---|---|
| | | | Rise, in. | Cells per linear in. | Uniformity |
| I | Flexible | A | 6.5 | 35 | Good. |
| I | do | B | 7.8 | 35 | Do. |
| II | do | A | 5.2 | 45 | Do. |
| III | Rigid | D | 9.8 | | Do. |
| IV | Semirigid | C | | | Do. |
| V | Flexible | A | 6.2 | | |
| VI | do | A | 6.8 | 20 | |
| VII | do | A | 7.4 | 35 | Do. | tion of foams was obtained. The above formulations were also repeated with diol-siloxane copolymers as the "polyol" reactant in the polyurethane foam composition. No stabilization of foam was obtained. When polyol material was added to the diol-siloxane reaction product and the resulting mixture employed in a polyurethane foam composition, no foam stabilization was obtained. Foam stabilization is obtained, without additional surfactant, only when the polyol or polyol mixture is a copolymeric product with an organosiloxane and wherein the organic polyol-siloxane copolymer contains from about 0.025 to about 6 weight percent organosiloxane groups.

The following data also demonstrates the remarkable properties of the organic polyol-siloxane copolymer product when it is used in the formation of a polyurethane foam as compared with use of prior art siloxane-oxyalkylene block copolymer surfactant additives and prior art polyols.

The formulation consisted of:

Component I

| | Parts by weight |
|---|---|
| Glycerol started polypropylene oxide having a nominal molecular weight of 300 and an average hydroxyl number of 56 | 100 |
| Water | 4.0 |
| Tetramethylbutane diamine | 4.8 |
| N-ethyl morpholine | 0.2 |
| Siloxane-oxyalkylene block copolymer surfactant | 9.6 |
| Stannous octoate | 2.2 |

22

Component II

| | |
|---|---|
| Tolylene diisocyanate | 52.3 |

The ingredients of Component I were mixed together at 0° C. with a 3000 r.p.m. mixer for about 8 seconds. Component II was then added and the mixing continued at 0° C. for about 3–5 seconds. The resulting mixture was then poured into a mold, allowed to foam and rise and then cured at 130° C. for about 15 minutes. The cured product was then center sliced and evaluated. The foam had a rise of 8.7 in. and contained about 180–190 cells per linear inch. In order to get such uniformity of small cells with the prior art materials, it was necessary to use in the above formulation a relatively large amount of siloxaneoxyalkylene block copolymer surfactant additive plus a relatively large amount of stannous octoate catalyst. If these items were reduced in quantity, the stability of the foam and the small cell structure would be hindered.

The above formulation was modified as follows:

Component I

| | Parts by weight |
|---|---|
| Glycerol started polypropylene oxide having a nominal molecular weight of 3000 and an average hydroxyl number of 56 | 70 |
| Polyol-siloxane copolymer composition (reaction product of above polyol and $(AcO)_2MeSiO(Me_2SiO)_{20}SiMe(OAc)_2$ containing about 1.7 weight percent siloxane group) | 30 |
| Water | 4.0 |
| Tetramethylbutane diamine | 4.8 |
| N-ethyl morpholine | 0.2 |
| Stannous octoate | 0.3 |

Component II

| | |
|---|---|
| Tolylene diisocyanate | 47.5 |

The formulation was treated in the same manner as described above to result in a cured polyurethane foam having a rise of 7.3 in. and containing about 170–180 cells per linear inch. This modified formulation employed an organic polyol-siloxane copolymer composition of the present invention to provide part of the reactant polyol and also to provide surfactant characteristics to the formulation. The amount of organosiloxane groups present in the copolymer composition was equivalent on a weight basis in the above formulation to 2.5 parts by weight of prior art siloxane-oxyalkylene block copolymer surfactant additive. It can thus be seen that the novel organic polyol-siloxane copolymer composition is about four times more effective in surfactant properties than the prior art siloxane-oxyalkylene block copolymer additives (2.5 parts by weight instead of 9.6 parts by weight per 100 parts by weight of total polyol composition). The amount of catalyst can also be reduced substantially from 2.2 parts by weight down to 0.3 part by weight/100 parts by weight of polyol composition. Also the amount of isocyanate can be reduced from 52.3 parts by weight down to 47.5 parts by weight/100 parts by weight of polyol composition. The reduction in required amounts of catalyst and isocyanate indicate that the organic polyol-siloxane copolymer composition is more reactive than prior art polyols in the formation of polyurethane foams.

It can thus be seen that the novel organic polyolsiloxane compositions provide improved polyurethane foam compositions and their inclusion in the starting materials provides an improved process for the production of polyurethane foams.

What is claimed is:

1. An organic polyol-organopolysiloxane copolymer compostiion suitable for reaction with an organic polyisocyanate in the presence of a catalyst and a blowing agent to produce a polyurethane foam, said composition having been produced by a process which comprises reacting at a temperature from 0° C. to 200° C. (a) an excess amount of organic polyol containing an average of more than two carbon-bonded hydroxyl radicals per polyol molecule and containing reactive groups selected from the group consisting of said hydroxy radicals. MO— groups where M is an alkali metal and monovalent olefinic groups, with (b) an organopolysiloxane containing at least two silicon-bonded groups per organopolysiloxane molecule that are reactive with the reactive groups of the organic polyol, said organopolysiloxane being present in the reaction mixture in an amount of from about 0.025 to about 6.5 parts by weight per 100 parts by weight of the organic polyol and said composition being composed of a substantial portion of unreacted polyol and a polyol-organopolysiloxane copolymer in which the organopolysiloxane groups are linked to polyol molecules by silicon to oxygen to carbon or silicon to carbon linkages.

2. The composition of claim 1 wherein the reactive groups of the organic polyol are said carbon-bonded hydroxyl radicals.

3. The composition of claim 1 wherein the reactive groups of the organic polyol are said MO— groups.

4. The composition of claim 1 wherein the reactive groups of the organic polyol are said olefinic groups and the reactive groups of the organopolysiloxane are silicon-bonded hydrogen atoms.

5. The composition of claim 4 wherein the monovalent olefinic group is a $CH_2=CHCH_2-$ group.

6. The composition of claim 1 wherein the groups on the organopolysiloxane that are reactive with the reactive groups of the organic polyol are selected from the group consisting of the silicon-bonded alkoxy groups, aryloxy groups, acyloxy groups, hydrogen atoms, halogen atoms, amino groups, hydroxyl groups, carboxyalkyl groups, monovalent isocyanato-substituted or halogen-substituted saturated aliphatic radicals and epoxyalkoxylkyl groups.

7. The composition of claim 2 wherein the groups on the organopolysiloxane that are reactive with the reactive groups of the organic polyol are selected from the group consisting of the silicon-bonded alkoxy groups, aryloxy groups, acyloxy groups, hydrogen atoms, halogen atoms, amino groups, hydroxyl groups, carboxyalkyl groups, monovalent isocyanato-substituted or halogen-substituted saturated aliphatic radicals and epoxyalkoxyalkyl groups.

8. The composition of claim 7 wherein the organic polyol contains an average of three or more carbon-bonded hydroxyl groups per polyol molecule.

References Cited

UNITED STATES PATENTS

| | | | |
|---|---|---|---|
| 3,190,903 | 6/1965 | Kopnick et al. | 260—448.8 |
| 3,246,048 | 4/1966 | Haluska | 260—824 |
| 2,834,748 | 5/1958 | Bailey et al. | 260—46.5 |
| 2,917,480 | 12/1959 | Bailey et al. | 260—46.5 |
| 2,967,171 | 1/1961 | Baines et al. | 260—824 |
| 3,193,567 | 7/1965 | Rossmy | 260—448.8 |
| 3,218,344 | 11/1965 | Bailey | 260—46.5 |
| 3,234,252 | 2/1966 | Pater | 260—46.5 |
| 3,175,995 | 3/1965 | Elliott et al. | 260—46.5 |
| 3,177,178 | 4/1965 | Bluestein | 260—46.5 |
| 3,075,927 | 1/1963 | Lanham | 260—2.5 |
| 3,075,928 | 1/1964 | Lanhan | 260—2.5 |

DONALD E. CZAJA, *Primary Examiner.*

L. J. BERCOVITZ, *Examiner.*

J. J. KLOCKO, M. I. MARQUIS, *Assistant Examiners.*